July 2, 1946. W. J. HALE 2,403,217
WHEELED VEHICLE
Filed Oct. 18, 1944 2 Sheets-Sheet 2

WILLIAM J. HALE *Inventor*

By *Clarence A. O'Brien and Harvey B. Jackson*
*Attorneys*

Patented July 2, 1946

2,403,217

UNITED STATES PATENT OFFICE 2,403,217

WHEELED VEHICLE

William J. Hale, Wise, Va., assignor of one-half to James C. Lipps, Wise, Va.

Application October 18, 1944, Serial No. 559,310

2 Claims. (Cl. 280—250)

This invention relates to an improved wheeled vehicle of the occupant-propelled and steered type, and an object of the invention is to provide a vehicle of this kind especially adapted for use by persons who are legless or without the use of their legs.

The present invention contemplates the provision of a three-wheeled vehicle including a low or underslung platform onto which the cripple or invalid may readily lift himself, a front steering wheel which may be readily controlled by one hand, driving means for the rear wheels of the vehicle including an elevated operating crank arranged to be readily operated by the other hand while the user assumes a sitting position on the platform, and a back rest for the occupant of the vehicle mounted on the rear end of the platform between the rear wheels.

A specific object of the invention is to provide a vehicle of the above character which is comparatively simple and durable in construction and easy and convenient to use.

The invention consists in the novel form, combination and arrangement of parts hereinafter more fully described, shown in the accompanying drawings and claimed.

In the drawings, wherein like reference characters indicate corresponding parts throughout the several views.

Figure 1:
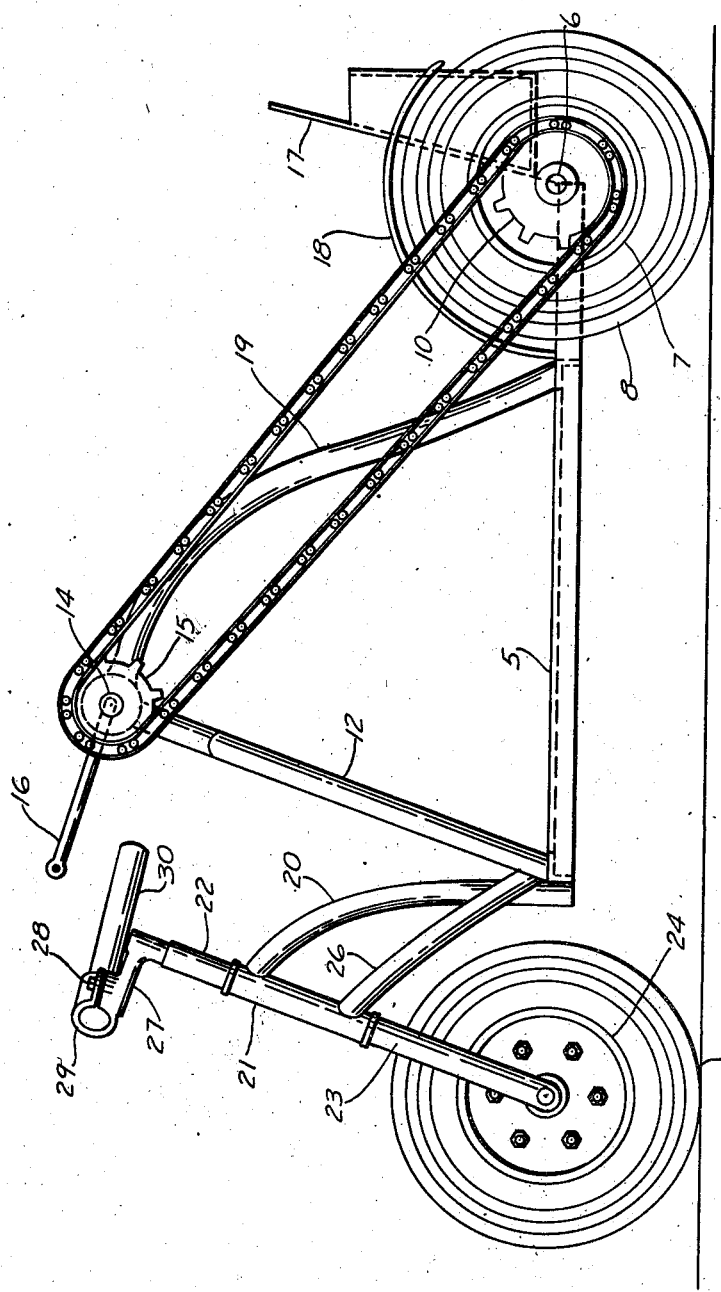
Figure 1 is a side elevational view of a wheeled vehicle constructed in accordance with the present invention.
Figure 2:
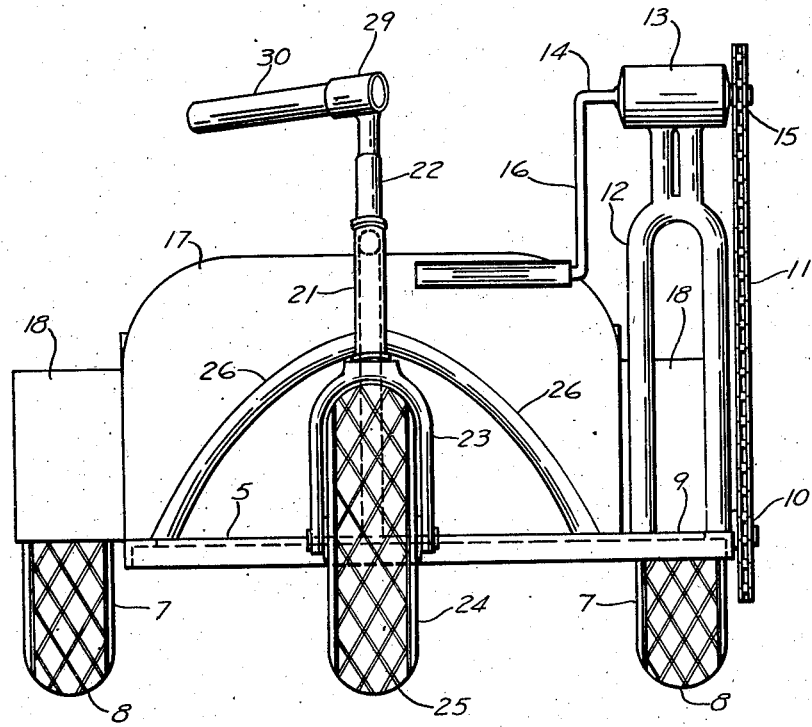
Figure 2 is a front elevational view thereof.
Figure 3:
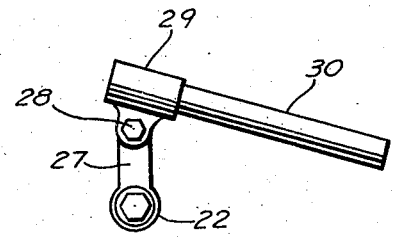
Figure 3 is a top plan view showing the arm on the upper end of the steering post and the steering handle carried by said arm.

Referring in detail to the drawings, the present wheeled vehicle includes a relatively wide platform 5 which is underslung or supported at a low position near enough to the ground to enable a legless person, or one not having use of his legs, to readily lift himself onto said platform. As shown, the rear end of the platform is suitably mounted beneath a rotatable rear axle 6 having rear wheels 7 equipped with pneumatic tires 8. The rear end portion of the platform extends between the rear wheels, and at one side, the platform 5 is provided with a lateral extension, as at 9, that projects in front of the rear wheel 7 at this side of the vehicle. The wheel 7 at the side adjacent the extension 9 is equipped with a sprocket wheel 10 at its outer side, and an endless driving chain 11 is passed around this sprocket wheel to form part of a driving mechanism for the vehicle. Rigid with and rising from the forward end of the lateral extension 9 of platform 5 is an upwardly and rearwardly inclined forked post 12 having a bearing 13 at the top in which is journaled a crank shaft 14. A second sprocket wheel 15 is secured on the outer end of crankshaft 14 and has the chain 11 passed around the same. At its inner end, crank shaft 14 is provided with a hand crank 16. The platform 5 is provided at its rear end and between the rear wheels 7 with a suitably constructed and braced rearwardly and upwardly inclined back rest 17 against which a suitable cushion may be placed when the vehicle is in use. Also, the platform is preferably provided at its rear end and at opposite sides with suitable fenders or wheel guards 18 that are supported over the upper portions of the rear wheels 7. In addition, the extension 9 carries a brace 19 that is rigidly fastened at its lower end to said extension directly in front of the rear wheel 7 at the adjacent side of the vehicle. This brace extends forwardly and upwardly and connects at its upper end to the bearing 13 so as to brace the post 12 in its rearwardly and upwardly inclined position.

Rigidly fixed to and rising from the forward end of platform 5 at a point midway between the rear wheels, or in the longitudinal axis of the main portion of the platform 5, is a post 20 having a forwardly curved upper end portion rigid with the upper end of a steering column 21. Journaled in the steering column 21 is a steering post 22 having a fork 23 at its lower end in which is mounted a front steering and supporting wheel 24 equipped with a pneumatic tire 25. Laterally and rearwardly extending braces 26 are fixed to opposite sides of the steering column 21 at its lower end, and the lower ends of these braces are rigidly attached to the forward end of the platform 5 at opposite sides of the post 20. The steering post 22 is equipped at its upper end with a forwardly extending arm 27 to which is bolted at 28 a sleeve 29 having one end of a steering bar or handle 30 secured therein. The steering bar or handle 30 projects laterally in a direction away from the crank 16 so that the latter is provided plenty of clearance for its operation. The arrangement is such that the person occupying the platform in a sitting position may readily reach the crank 16 to operate the same with one hand while controlling the steering wheel by grasping the steering handle or bar 30 with the other hand. By turning the crank 16 in the proper direction, the vehicle may be propelled either forwardly or rearwardly, and the direction of travel may be controlled by turning the steering post 22 through the actuation of steering handle or bar 30.

It will be seen that I have provided a very simple and durable vehicle of the kind described which is convenient to use and operate, particularly by crippled or invalid persons.

I claim:

1. A wheeled vehicle of the character described comprising a low horizontal platform, a rotatable rear axle having the rear end of the platform suspended therefrom, traction wheels secured on the ends of the rear axle and disposed at opposite sides of the rear end portion of the platform, a substantially flat transverse back rest mounted on the rear end of said platform between the rear traction wheels, said platform being provided at one side with a lateral extension projecting in front of one of the rear traction wheels, a sprocket wheel carried by said one rear traction wheel, a rearwardly and upwardly inclined post mounted on the forward end of said lateral extension and having a bearing at its upper end, a transverse horizontal shaft journaled in said bearing and equipped at its outer end with a sprocket wheel, a sprocket chain passing around said sprocket wheels, a hand crank on the inner end of said transverse horizontal shaft, a post rigid with and extending upwardly and forwardly from the forward end of the platform intermediate the sides of the latter, a steering column rigid with the upper end of said last-named post, a steering post journaled in said steering column and having a steering and supporting wheel of the same size as the rear wheels mounted in the lower end thereof, and a single steering handle secured on the upper end of said steering post and projecting laterally therefrom in a direction away from said crank when the supporting and steering wheel is disposed to travel straight ahead, the platform being unobstructed from the rear wheels to its front end at the other side thereof and being disposed near enough to the ground to enable a legless person to mount the same or dismount therefrom in front of the rear wheels and the back rest.

2. The construction defined in claim 1, in combination with a brace fixed at its lower end on the rear end of said extension and projecting upwardly and forwardly therefrom, the upper end of said brace being attached to said bearing, and braces rigid with the lower end of the steering column and extending rearwardly and laterally therefrom, the lower ends of the last named braces being fixed to the forward end of the platform at points spaced from and at opposite sides of the steering column.

WILLIAM J. HALE.